US006821676B2

(12) United States Patent
Ouwerkerk et al.

(10) Patent No.: US 6,821,676 B2
(45) Date of Patent: Nov. 23, 2004

(54) METAL HYDRIDE BATTERY MATERIAL WITH HIGH STORAGE CAPACITY

(75) Inventors: Martin Ouwerkerk, Eindhoven (NL); Anna-Maria Janner, Eindhoven (NL); Petrus Henricus Laurentius Notten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 213 days.

(21) Appl. No.: 09/995,457

(22) Filed: Nov. 27, 2001

(65) Prior Publication Data

US 2002/0122981 A1 Sep. 5, 2002

(30) Foreign Application Priority Data

Nov. 27, 2000 (EP) .............................................. 00204211

(51) Int. Cl.[7] .............................. H01M 4/58; C01B 6/24
(52) U.S. Cl. ............................... 429/218.2; 429/218.1; 429/231.6; 420/900
(58) Field of Search ......................... 429/218.2, 218.1, 429/209, 231.6; 420/900; 423/644

(56) References Cited

U.S. PATENT DOCUMENTS

| 4,259,110 A | * | 3/1981 | Pezat et al. ................ 75/168 J |
| 5,922,491 A | * | 7/1999 | Ikawa et al. ................ 429/218 |
| 6,099,811 A | * | 8/2000 | Stetson et al. .............. 422/212 |
| 6,491,866 B1 | * | 12/2002 | Ovshinsky et al. .......... 420/402 |

FOREIGN PATENT DOCUMENTS

| JP | 56114801 | 8/1981 | ............. C01B/3/00 |
| WO | WO 0134861 | 11/2000 | ........... C22C/23/02 |
| WO | WO 0148837 | 12/2000 | |

OTHER PUBLICATIONS

T.B. Massalski et al; "Binary alloy phase diagrams", vol. 2, 1987, Am. Soc. for Metals, Ohio, US, XP002202367.*
Patent Abstracts of Japan; vol. 1997, No. 09, Sep. 30, 1997, JP 09125172.
Database CA, Chemical Abstracts Service, Columbus Ohio, US, Spassov, et al., "Nanocrystalline Mg–Ni–Based Hydrogen Stroage Alloys Produced by Nanocrystallization", XP002202368.
M. Khrussanova et al; "Effect of Some Partial Substitutions in Lanthanum–Magnesium Alloys on their Hydriding Kinetics", Database CA, Chemical Abstracts Service, Columbus, Ohio, Accessionno 109:193753 CA, XP002202369.

* cited by examiner

*Primary Examiner*—Patrick Ryan
*Assistant Examiner*—Angela J. Martin

(57) ABSTRACT

A hydrogen storage material has a magnesium-containing intermetallic compound which can form a hydride with hydrogen. The intermetallic compound has an alloy of magnesium and a trivalent metal selected from the group of Sc, Y, La and the rare earth elements. The hydrogen storage material can further have a catalytically active material.

20 Claims, No Drawings

METAL HYDRIDE BATTERY MATERIAL WITH HIGH STORAGE CAPACITY

The present invention relates to a hydrogen storage material, comprising a magnesium-containing intermetallic compound capable of forming a hydride with hydrogen. The invention also relates to an electrochemical cell comprising such a hydrogen storage material.

Rechargeable batteries can be discharged and then restored to their original state for re-use. Rechargeable batteries are increasingly used in portable electronic equipment such as telephones, walkmans and computers. A known type of rechargeable battery is the so-called rechargeable metal hydride battery, which has a relatively high storage capacity per unit volume. An example of such a metal hydride battery is a battery comprising $LaNi_5$ as the electrochemically active material, more specifically as a negative electrode. In the discharged condition, the negative electrode comprises $LaNi_5$, while in the charged condition hydrogen is absorbed by said electrode, resulting in $LaNi_5H_6$. A disadvantage of this type of battery is the relatively low storage capacity per unit weight. The latter is caused by the high density of the metal hydride, which is about 7 g/cm$^3$.

For some time now research has been directed to suitable metal hydrides with a lower density which can act as a hydrogen storage material. In theory, magnesium is very suitable for hydrogen absorption. However, the temperature at which the magnesium can be charged and discharged is 400° C. Magnesium-nickel alloys appear to be better candidates for hydrogen storage material which can be used in electrochemical cells, as these alloys can be used for hydrogen absorption at lower temperatures.

The use of magnesium-nickel hydride for hydrogen storage is also disclosed in JP-56114801. According to the latter publication, said material can store hydrogen in a stable way at high temperatures. Although magnesium-nickel hydride can absorb a relatively large amount of hydrogen, it is as such not suitable as an electrochemically active material in an electrochemical cell. One of the reasons for this is the relatively slow kinetics of hydrogen absorption and hydrogen release.

In order to improve the kinetics of hydrogen absorption and hydrogen release to a sufficient level and to restrict corrosion, the amount of nickel added to a magnesium-nickel alloy has to be so high that only a small improvement is obtained in comparison with the known $LaNi_5$ material.

The present invention aims to provide a hydrogen storage material which can be applied in an electrochemical cell and which comprises a magnesium-containing intermetallic compound capable of forming a hydride with hydrogen and having a high storage capacity per unit weight.

To this end, the present invention provides for a hydrogen storage material comprising a magnesium-containing intermetallic compound, which is characterized in that the intermetallic compound comprises an alloy of magnesium and a trivalent metal selected from the group of Sc, Y, La, and the rare earth elements.

It appears that alloys of magnesium with one of the above trivalent metals can be easily charged and discharged with hydrogen at room temperature. Moreover, the gravimetrical storage capacity of alloys of magnesium and a trivalent metal selected from the group of Sc, Y, La and the rare earth elements is considerably higher than the gravimetrical storage capacity of $LaNi_5$. As a result, said alloys can advantageously be used as hydrogen storage materials in electrochemical cells. As rechargeable batteries are increasingly used in portable electronic equipment, the gravimetrical storage capacity is of the utmost importance.

In a particular embodiment, the intermetallic compound comprises an alloy selected from the group of scandium-magnesium, gadolinium-magnesium and yttrium-magnesium.

Among the above group of magnesium alloys, alloys of magnesium with the trivalent metals scandium, gadolinium and yttrium have relatively very low densities and accordingly relatively high gravimetrical storage capacities.

Preferably, the intermetallic compound comprises a scandium-magnesium alloy.

Scandium-magnesium alloys are capable of reversible absorption of hydrogen at room temperature. The amount of hydrogen which can be absorbed per unit weight is such that the gravimetrical storage capacity shows an improvement by more than a factor 4 in comparison with the gravimetrical storage capacity of the known $LaNi_5H_x$.

RU-2072113 discloses a hydrogen-absorbing alloy of the $AB_5$ type, comprising lanthanum and nickel, which additionally may contain a small amount of scandium. In fact, this material is completely different from the hydrogen storage material according to the present invention as the latter basically relates to a magnesium-scandium alloy without any lanthanum or nickel present.

Advantageously, the scandium-magnesium alloy comprises 1–50 at. % scandium and 50–99 at. % magnesium, more advantageously 15–40 at. % scandium and 60–85 at. % magnesium, and preferably 30–40 at. % scandium and 60–70 at. % magnesium.

The specific amounts of the different components in the alloy are determined by balancing the kinetics and the storage capacity against each other. As was mentioned above, magnesium has a high storage capacity. The kinetics of charging and discharging of the alloy can be improved by the addition of scandium.

Preferably, the scandium-magnesium alloy comprises $Sc_{0.35}Mg_{0.65}H_x$.

Said alloy provides for a very good balance between the hydrogen storage capacity and kinetics.

In a preferred embodiment, the hydrogen storage material according to the present invention comprises an amount of a catalytically active material.

Such a catalytically active material increases the kinetics of the hydrogen uptake of the hydrogen storage material.

Advantageously, the catalytically active material comprises at least one metal selected from the group consisting of palladium, platinum, cobalt, nickel, rhodium or iridium, and/or a composition of the formula $DE_3$, wherein D is at least one element selected from the group consisting of Cr, Mo and W, and E is at least one element selected from the group consisting of Ni and Co.

Preferably, the catalytically active material comprises palladium, platinum or rhodium.

It has been found that the addition of, for example, only 0.6 at. % of palladium to the alloy increases the rate of hydrogen uptake by several orders of magnitude. The addition of 1.2 at. % palladium yields even better results in hydrogen uptake.

Furthermore, the present invention relates to an electrochemically active material which is characterized in that the material comprises a hydrogen storage material according to the present invention as described above.

The hydrogen storage material according to the present invention can advantageously be used in fuel cells.

The invention also relates to an electrochemical cell comprising a negative electrode. Said electrochemical cell is characterized in that the negative electrode comprises a hydrogen storage material as described above.

The electrochemical cell preferably comprises a rechargeable battery.

Finally, the present invention relates to electronic equipment powered by at least one electrochemical cell. Said electronic equipment is characterized in that the at least one electrochemical cell is an electrochemical cell as described above.

The present invention is illustrated by the following embodiments, which are given by way of example only.

Embodiment 1

Thin layers of $Sc_{0.3}Mg_{0.7}$ and $Sc_{0.2}Mg_{0.8}$ are electrochemically charged and discharged with hydrogen in a 1M KOH solution at room temperature. The thin layers comprise films, each having a thickness of about 200 nm. Said films are provided on a polished, quartz substrate by means of electron-beam evaporation. A top layer of palladium is provided on the respective films in order to protect the films against oxidation and to catalyze the hydrogen absorption and hydrogen release. The reference electrode is a Hg/HgO electrode.

The discharge is measured in order to determine the amount of charge which can be reversibly taken up in the film.

The measurements show a charge capacity of 5428 C/g for $Sc_{0.3}Mg_{0.7}$, which corresponds to a gravimetrical storage capacity of 1508 mAh/g. The film of $Sc_{0.2}Mg_{0.8}$ shows a charge capacity of 5948 C/g, which corresponds to a gravimetrical storage capacity of 1652 mAh/g. For example, $LaNi_5$ has a gravimetrical storage capacity of only 372 mAh/g. This means that the gravimetrical storage capacity of the scandium-magnesium alloy according to the present invention shows an improvement by more than a factor 4.

The following table shows the storage capacities of several hydrogen storage materials according to the present invention. The first two columns show the hydrogen storage material in the discharged state and in the charged state, respectively. The third column refers to the molar weight of the hydrogen storage material in the discharged state, while the fourth column refers to the density of the hydrogen storage material in the discharged state. The calculated volumetrical storage capacity (VSC) and the calculated gravimetrical storage capacity (GSCc) are presented in the fifth and sixth column, respectively. Finally, column seven shows the measured gravimetrical storage capacity (GSCm).

Embodiment 2
Preparation of the Scandium-Magnesium Alloy

A scandium-magnesium alloy is made in bulk in a molybdenum crucible. The crucible has a height of 55 mm, a diameter of about 20 mm and a wall thickness of 1.8 mm. The magnesium is placed at the bottom of the crucible, while the heavier scandium lies on top of the magnesium. The total weight of the magnesium and scandium in the crucible is 5 g. When the crucible has been filled, it is sealed with a molybdenum lid.

The contents of the crucible are melted at 1100° C. during 6 hours. During that time, the crucible is placed in a quartz tube under an argon atmosphere. After the melting treatment, the crucible is quenched in water followed by an annealing treatment at 450° C. during 2 days in order to bring the alloy into thermodynamic equilibrium. The $Sc_{0.35}Mg_{0.65}$ alloy is then converted to the γ-phase.

If the presence of palladium in the alloy is desired, then Cc0.96Pd0.04 is used as a starting material instead of pure scandium.

After the annealing treatment, the molybdenum of the crucible is mechanically removed in a turning lathe. The homogeneity of the pellet is checked by measuring the top side and the bottom side by XRD.

Embodiment 3
Capacity Measurement of the Scandium-Magnesium Alloy

A pressed pellet with 15–30 mg $Sc_{1-x}Mg_x$ powder and 135–120 mg Ni powder is attached to a nickel holder. The pellet is electrolytically charged and discharged in a 2M KOH solution against a Pt counter electrode in a compartment which is separated from the counter electrode by glass frit. The tip of the reference electrode (Hg/HgO) is placed a few millimeters from the pellet. The potential difference between the pellet and the reference electrode is measured. Coulomb counting is used to calculate the charge and discharge of the pellet. The charging current intensity is 350 mA/g. The discharging current intensity is 7 to 70 mA/g (0.02 C to 0.2 C rate). The measurements take place at 25° C.

Embodiment 4

Two alloy samples were prepared by the method of embodiment 2 and measured in accordance with embodiment 3.

The first alloy comprised a pellet of 29.9 mg $Sc_{0.3}Mg_{0.65}H_x$, while the second alloy comprised a pellet of 14.1 mg $Sc_{0.347}Mg0.647Pd_{0.006}H_x$.

| Material Discharged | Material charged | Molar weight Discharged | Density Discharged | VSC Ah/l | GSCc mAh/g | GSCm mAh/g |
|---|---|---|---|---|---|---|
| $GdMgH_2$ | $GdMgH_5$ | 183.578 | 4.82 | 2078 | 431 | |
| $YMgH_2$ | $YmgH_5$ | 115.233 | 3.11 | 2113 | 680 | |
| $YMg_2H_2$ | $YMg_2H_7$ | 139.545 | 2.64 | 2459 | 927 | |
| $Sc_{0.2}Mg_{0.8}H_{0.3}$ | $Sc_{0.2}Mg_{0.8}H_{2.0}$ | 28.76 | 1.99 | 3288 | 1545 | 1652 |
| $Sc_{0.3}Mg_{0.7}H_{0.5}$ | $Sc_{0.3}Mg_{0.7}H_{2.0}$ | 30.86 | 2.12 | 3193 | 1347 | 1508 |

The known $LaNi_5$ shows a gravimetrical storage capacity of 367 mAh/g. All the materials of the above table show an improvement in gravimetrical storage capacity in comparison with $LaNi_5$. The measured values of the hydrogen storage materials $Sc_{0.2}Mg_{0.8}$ and $Sc_{0.3}Mg_{0.7}$ show an improvement in gravimetrical storage capacity by more than a factor 4.

The first alloy shows a gravimetrical capacity of 3.5 mAh/g after several of two cycles of charging and discharging, while the second alloy, under the same conditions, shows a gravimetrical capacity of 980 mAh/g.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A hydrogen storage material comprising:
   hydrogen; and
   a magnesium-containing intermetallic compound capable of forming a hydride with the hydrogen at room temperature, wherein the intermetallic compound includes an alloy of magnesium and a trivalent metal selected from a group consisting of Sc, Y, and the actinide series of rare earth elements.

2. The hydrogen storage material of claim 1, wherein the alloy is selected from the group of scandium-magnesium, and yttrium-magnesium.

3. The hydrogen storage material of claim 1, wherein the intermetallic compound includes a scandium-magnesium alloy.

4. The hydrogen storage material of claim 3, the scandium-magnesium alloy includes 1–50 at. % scandium and 50–99 at. % magnesium.

5. The hydrogen storage material of claim 3, the scandium-magnesium alloy includes 15–40 at. % scandium and 60–85 at. % magnesium.

6. The hydrogen storage material of claims 3, the scandium-magnesium alloy includes 30–40 at. % scandium and 60–70 at. % magnesium.

7. The hydrogen storage material of claim 3, the scandium-magnesium alloy includes $Sc_{0.35}Mg_{0.65}H_x$.

8. The hydrogen storage material of claim 1, further comprising:
   an amount of a catalytically active material.

9. The hydrogen storage material of claim 8,
   wherein the catalytically active material includes at least one metal selected from the group consisting of palladium, platinum, cobalt, nickel, rhodium or iridium, and/or a composition of the formula DE3;
   wherein D is at least one element selected from the group consisting of Cr, Mo and W; and
   wherein E is at least one element selected from the group consisting of Ni and Co.

10. The hydrogen storage material of claim 8, wherein the catalytically active material includes one of palladium, platinum or rhodium.

11. An electrochemically active material, comprising:
    hydrogen; and
    a magnesium-containing intermetallic compound capable of forming a hybride with the hydrogen at room temperature, wherein the intermetallic compound includes an alloy of magnesium and a trivalent metal selected from a group consisting of Sc, Y, and the actinide series of rare earth elements.

12. An electrochemical cell, comprising:
    a positive electrode; and
    a negative electrode operatively paired with said positive electrode, said negative electrode including
    hydrogen, and
    a magnesium-containing intermetallic compound capable of forming a hybride with the hydrogen at room temperature, wherein the intermetallic compound includes an alloy of magnesium and a trivalent metal selected from a group consisting of Sc, Y, and the actinide series of rare earth elements.

13. An electronic equipment powered by at least one electrochemical cell, each electrochemical cell comprising:
    a positive electrode; and
    a negative electrode operatively paired with said positive electrode, said negative electrode including
    hydrogen, and
    a magnesium-containing intermetallic compound capable of forming a hybride with the hydrogen at room temperature, wherein the intermetallic compound includes an alloy of magnesium and a trivalent metal selected from a group consisting of Sc, Y, and the actinide series of rare earth elements.

14. The electrochemically active material of claim 11, further comprising:
    an amount of a catalytically active material.

15. The electrochemical cell of claim 12, further comprising:
    an amount of a catalytically active material.

16. The electronic equipment of claim 13, wherein each electrochemical cell further comprises an amount of a catalytically active material.

17. The hydrogen storage material of claim 1, wherein the room temperature is 25° C.

18. The electrochemically active material of claim 11, wherein the room temperature is 25° C.

19. The electrochemical cell of claim 12, wherein the room temperature is 25° C.

20. The electronic equipment of claim 13, wherein the room temperature is 25° C.

* * * * *